US012589855B2

(12) United States Patent　　　(10) Patent No.:　　US 12,589,855 B2

Benthien et al.　　　(45) Date of Patent:　　Mar. 31, 2026

(54) WINDOW MOUNTING STRUCTURE FOR SNAP AND CLICK MOUNTING OF A WINDOW ASSEMBLY OF AN AIRCRAFT

(71) Applicant: Airbus Operations GmbH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/364,660

(22) Filed: Aug. 3, 2023

(65) Prior Publication Data

US 2024/0158067 A1　　May 16, 2024

(30) Foreign Application Priority Data

Aug. 10, 2022　(EP) ..................................... 22189755

(51) Int. Cl.
B64C 1/14　　　(2006.01)
(52) U.S. Cl.
CPC .................................. B64C 1/1492 (2013.01)
(58) Field of Classification Search
CPC ........................... B64C 1/1492; B64C 1/1484
See application file for complete search history.

(56) References Cited

U.S. PATENT DOCUMENTS

| | | | |
|---|---|---|---|
| 2,388,786 A | 11/1945 | Milton et al. | |
| 4,541,595 A | 9/1985 | Fiala et al. | |

| | | | | |
|---|---|---|---|---|
| 4,793,108 A | * | 12/1988 | Bain | ..................... B64C 1/1492 52/208 |
| 6,736,352 B2 | * | 5/2004 | Bladt | .................... B64C 1/1484 244/119 |
| 7,552,896 B2 | * | 6/2009 | Coak | ..................... B64C 1/1492 244/119 |
| 7,823,833 B2 | * | 11/2010 | Wood | .................... F16B 5/0635 52/774 |
| 8,015,762 B2 | * | 9/2011 | Krahn | ................... B64C 1/1492 52/204.597 |
| 8,297,556 B2 | * | 10/2012 | Krahn | ................... B64C 1/1492 244/132 |
| 8,544,798 B2 | * | 10/2013 | Eberth | ...................... B64C 1/12 244/129.1 |
| 8,695,923 B2 | * | 4/2014 | Eberth | ...................... B64C 1/12 244/129.1 |
| 8,940,215 B2 | * | 1/2015 | Milliere | ............... B64C 1/1492 403/345 |

(Continued)

FOREIGN PATENT DOCUMENTS

| | | | | |
|---|---|---|---|---|
| EP | 2114764 B1 | 4/2011 | | |
| FR | 2959480 A1 | * | 11/2011 | ........... B64C 1/1492 |

OTHER PUBLICATIONS

European Search Report for corresponding European Patent Application No. 22189755 dated Jan. 27, 2023; priority document.

*Primary Examiner* — Philip J Bonzell
(74) *Attorney, Agent, or Firm* — Greer, Burns & Crain Ltd.

(57)　　　　ABSTRACT

A window mounting structure that has a mounting support interface which is installed on an aircraft fuselage. The window pane assembly is inserted in the window opening and a mounting frame is pressed onto the mounting support interface. The mounting frame may be locked in place with a locking member.

13 Claims, 7 Drawing Sheets

(56) References Cited

U.S. PATENT DOCUMENTS

| | | | | |
|---|---|---|---|---|
| 8,998,140 B2* | 4/2015 | Yokoi | B60J 10/16 | |
| | | | 174/358 | |
| 9,415,854 B2* | 8/2016 | Yokoi | B60J 10/16 | |
| 10,337,236 B2* | 7/2019 | Yokoi | B64D 45/02 | |
| 2003/0234322 A1* | 12/2003 | Bladt | B64C 1/1484 | |
| | | | 244/129.3 | |
| 2007/0194177 A1* | 8/2007 | Coak | B64C 1/1492 | |
| | | | 244/129.3 | |
| 2008/0067288 A1* | 3/2008 | Eberth | B64C 1/1492 | |
| | | | 244/129.3 | |
| 2008/0217479 A1* | 9/2008 | Wood | F16B 5/0635 | |
| | | | 403/345 | |
| 2009/0084900 A1* | 4/2009 | Krahn | B64C 1/1492 | |
| | | | 244/129.3 | |
| 2010/0043300 A1* | 2/2010 | Krafn | B64C 1/1492 | |
| | | | 49/506 | |
| 2011/0016823 A1* | 1/2011 | Wood | E06B 3/5481 | |
| | | | 52/745.16 | |
| 2011/0186684 A1* | 8/2011 | Eberth | B64C 1/12 | |
| | | | 244/129.3 | |
| 2013/0043348 A1* | 2/2013 | Milliere | B64C 1/1492 | |
| | | | 156/91 | |
| 2013/0062468 A1* | 3/2013 | Yokoi | B60J 10/16 | |
| | | | 277/637 | |
| 2014/0319276 A1* | 10/2014 | Yokoi | B64C 1/1492 | |
| | | | 244/129.3 | |
| 2015/0060603 A1* | 3/2015 | Yokoi | E06B 5/18 | |
| | | | 49/463 | |

* cited by examiner

WINDOW MOUNTING STRUCTURE FOR SNAP AND CLICK MOUNTING OF A WINDOW ASSEMBLY OF AN AIRCRAFT

CROSS-REFERENCES TO RELATED APPLICATIONS

This application claims the benefit of the European patent application No. 22189755.6 filed on Aug. 10, 2022, the entire disclosures of which are incorporated herein by way of reference.

FIELD OF THE INVENTION

The invention relates to a window mounting structure. Furthermore, the invention relates to an aircraft fuselage and an aircraft equipped with such a mounting structure. The invention also relates to a mounting and a dismounting method.

BACKGROUND OF THE INVENTION

Currently, the inner window frames of aircraft are made of several parts that require different materials. It is required to perform many steps, such as drilling in the outer window frame, and eye bolt wet installation. Hybrid configurations that use bonding and bolting are known but require high effort.

SUMMARY OF THE INVENTION

It is an object of the invention to improve window installations in aircraft.

The invention provides a window mounting structure for mounting a window pane assembly for an aircraft, the window mounting structure comprising:

a fuselage portion that includes an outer skin portion, the outer skin portion having a window opening having a circumference and a rim portion that is disposed along the circumference;

a mounting support interface that is fastened to the rim portion and that has a mounting portion that extends parallel to the circumference with a predetermined distance;

a mounting frame that includes an engaging portion that is configured to be engaged with the mounting portion in a form-fitting manner, preferably solely, by pressing the mounting frame towards the mounting support interface.

Preferably, the mounting support interface includes a rim fastening portion that extends radially outward from the window opening, and the rim fastening portion is fastened to and/or covers the rim portion.

Preferably the mounting support interface includes a window pane assembly support portion that extends radially inward from the window opening so as to engage the window pane assembly in a form-fitting manner and to block an axial movement of the window pane assembly in an outward direction.

Preferably, the rim fastening portion and or the window pane assembly support portion are formed along the entire circumference. Preferably, the engaging portion is formed in a plurality of sections that are distributed along the circumference or wherein the engaging portion is formed along the entire circumference.

Preferably, the mounting support interface is integrally formed as a single unitary member.

Preferably, the mounting frame includes a window pane assembly retaining portion that is configured to block axial movement of the window pane assembly in an inward direction and/or press the window pane assembly in an outward direction.

Preferably, the mounting frame includes a cabin interface portion that extends axially inward and is configured to support and/or attach to an interior cabin component.

Preferably, the mounting frame includes a locking portion that is configured to allow disengaging of the engaging portion from the mounting portion when in an unlocked state and to prevent disengaging of the engaging portion from the mounting portion when in a locked state.

Preferably, the locking portion is arranged on a side facing away from the engaging portion. Preferably, the locking portion includes a securing mechanism that prevents the locking portion from accidentally switching from the locked state to the unlocked state. Preferably, the locking portion is configured to accept a tool for disengagement of the engaging portion from the mounting portion.

Preferably, the locking portion comprises a locking protrusion that engages the mounting support interface in a form-fitting manner in the locked state.

Preferably, the mounting frame comprises a locking member that engages the engaging portion so as to prevent disengagement of the engaging portion from the mounting portion, when the locking portion is in the locked state. Preferably, the locking portion comprises a locking opening, and the locking member is inserted in the locking opening when in the locked state.

Preferably, the mounting frame includes at least one inspection opening that allows a visual inspection of the placement of the mounting frame on the mounting support interface.

The invention provides an aircraft fuselage comprising a window pane assembly that is arranged in the window opening and a previously described window mounting structure, wherein the window mounting structure fastens the window pane assembly to the aircraft fuselage.

The invention provides an aircraft comprising such an aircraft fuselage.

The invention provides a method for mounting a window pane assembly to an aircraft fuselage, the method comprising:

a) preparing a fuselage portion that includes an outer skin portion, the outer skin portion having a window opening having a circumference and a rim portion that is disposed along the circumference and fastening a mounting support interface to the rim portion, wherein the mounting support interface has a mounting portion that extends parallel to the circumference with a predetermined distance;

b) pressing a mounting frame that includes an engaging portion towards the mounting support interface such that the engaging portion engages the mounting portion in a form-fitting manner and the mounting frame retains the window pane assembly.

Preferably, step a) includes fastening or covering the rim portion with a rim fastening portion that extends radially outward from the window opening.

Preferably, step a) includes inserting window pane assembly into the window opening such that the window pane assembly engages a window pane assembly support portion that extends radially inward from the window opening in a form-fitting manner.

Preferably, step b) includes engaging or pressing the window pane assembly in an outward direction with a window pane assembly retaining portion of the mounting frame, when the mounting frame is pressed towards the mounting support interface.

Preferably, the method includes a step c) of locking the mounting frame in place with a locking portion.

Preferably, step c) includes locking the mounting frame in place by inserting a locking member into the locking portion.

Preferably, step c) includes locking the mounting frame in place by simultaneously with step b) engaging a locking protrusion of the mounting frame with the mounting support interface in a form-fitting manner.

Preferably, step c) includes securing the locking portion with a securing mechanism that prevents the locking portion from accidentally switching from the locked state to the unlocked state by inserting the locking member into the locking opening.

The invention provides a method for dismounting a window pane assembly from an aircraft fuselage by performing step b) or the steps of the previously described method in reverse order.

Preferably, step b) additionally includes engaging a tool with the locking portion and applying a force that disengages the locking portion from the mounting support interface or the engaging portion from the mounting portion.

With these measures a single integral part can be easily installed by pressing. No tools are necessary for mounting the windows. The parts are also corrosion resistant and easy to replace. The mounting frame (or window frame) has an easy snap and click mounting mechanism. The mounting may be achieved using an all-around barb and hook configuration. With this configuration, it is possible that in a scenario when the pressure inside the aircraft drops below the environmental pressure, the window mounting structure generates a force that increases the form-fitting connection between the mounting frame and the mounting support interface.

It is also possible to use dedicated snap and click bolts. Generally the all-around configuration allows for a higher load transfer than the dedicated bolt configuration. The parts may be made from PA66. The parts can have an integrated cabin interface. Another idea is to integrate an eye for unhooking the frame. The eye can also be used as a securing mechanism. In contrast to the known configurations the number of parts can be massively reduced. Furthermore, the effects of corrosion can be avoided. The parts can be easily mass-manufactured by injection molding, for example. Another idea is that due to its configuration the window mounting structure reinforces the skin against deformation due to the pressure differential between cabin and environment. There is no need for sensitive drillings in the structure. The overall weight can be reduced.

BRIEF DESCRIPTION OF THE DRAWINGS

Embodiments of the invention are described in more detail with reference to the accompanying schematic drawings that are listed below

4

DETAILED DESCRIPTION OF THE PREFERRED EMBODIMENTS

Figure 1:
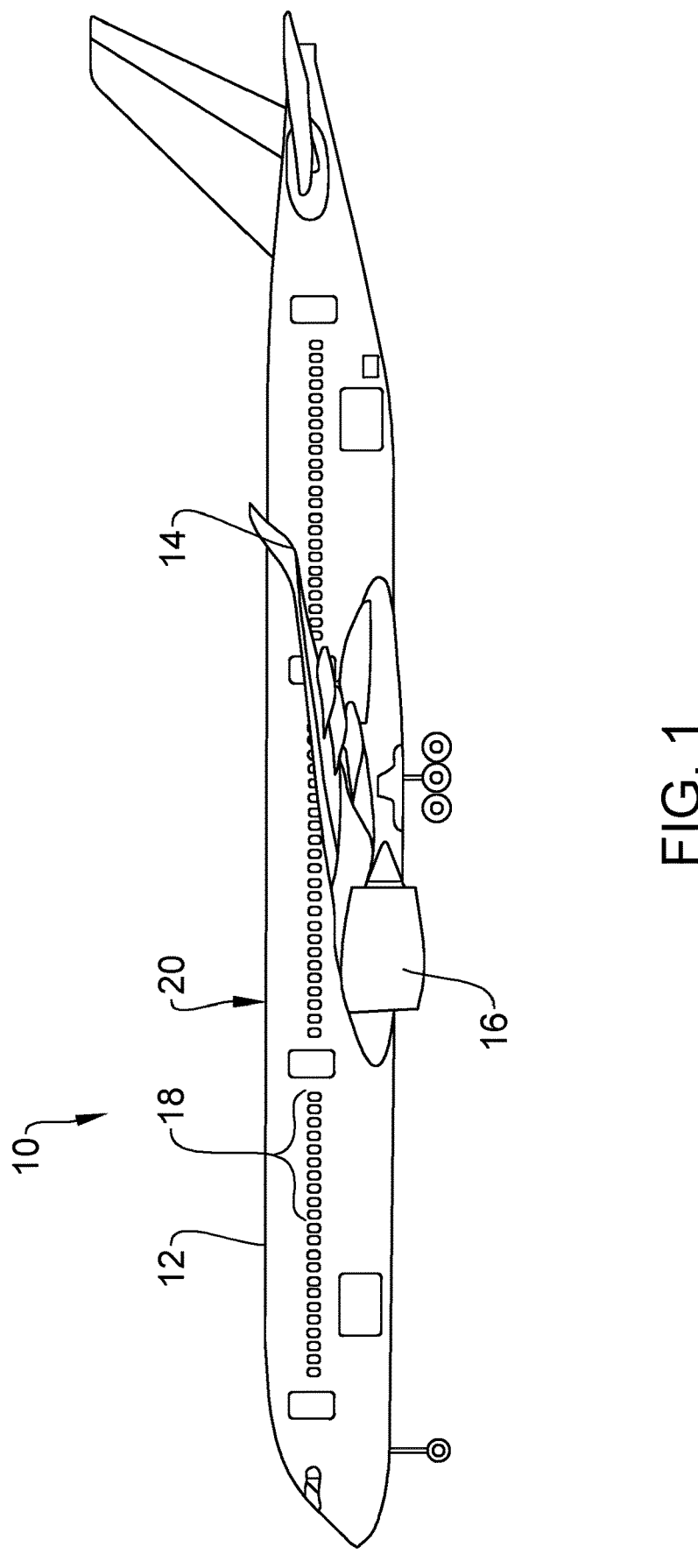
FIG. 1 depicts an embodiment of an aircraft.

Referring to FIG. 1, an embodiment of an aircraft 10 according to the invention is depicted. The aircraft 10 comprises a fuselage 12. The aircraft 10 has a pair of wings 14 that are attached to the fuselage 12. Furthermore, each wing 14 comprises an engine 16 for propulsion. Along the longitudinal direction of the aircraft 10, a plurality of windows 18 is arranged that allow passengers to look outside of the passenger cabin 20.

Figure 2:
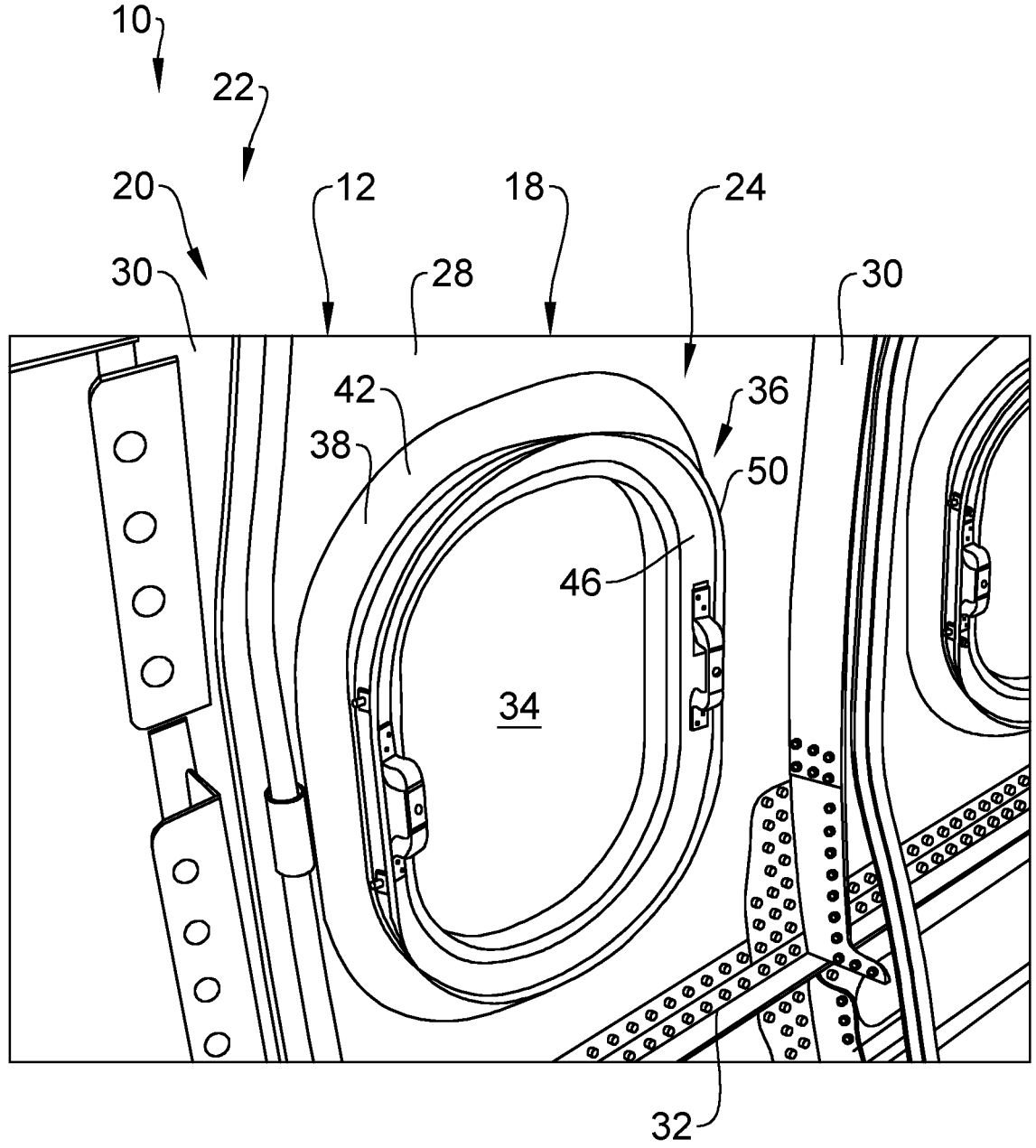
FIG. 2 depicts a perspective view of a fuselage portion.
Figure 3:
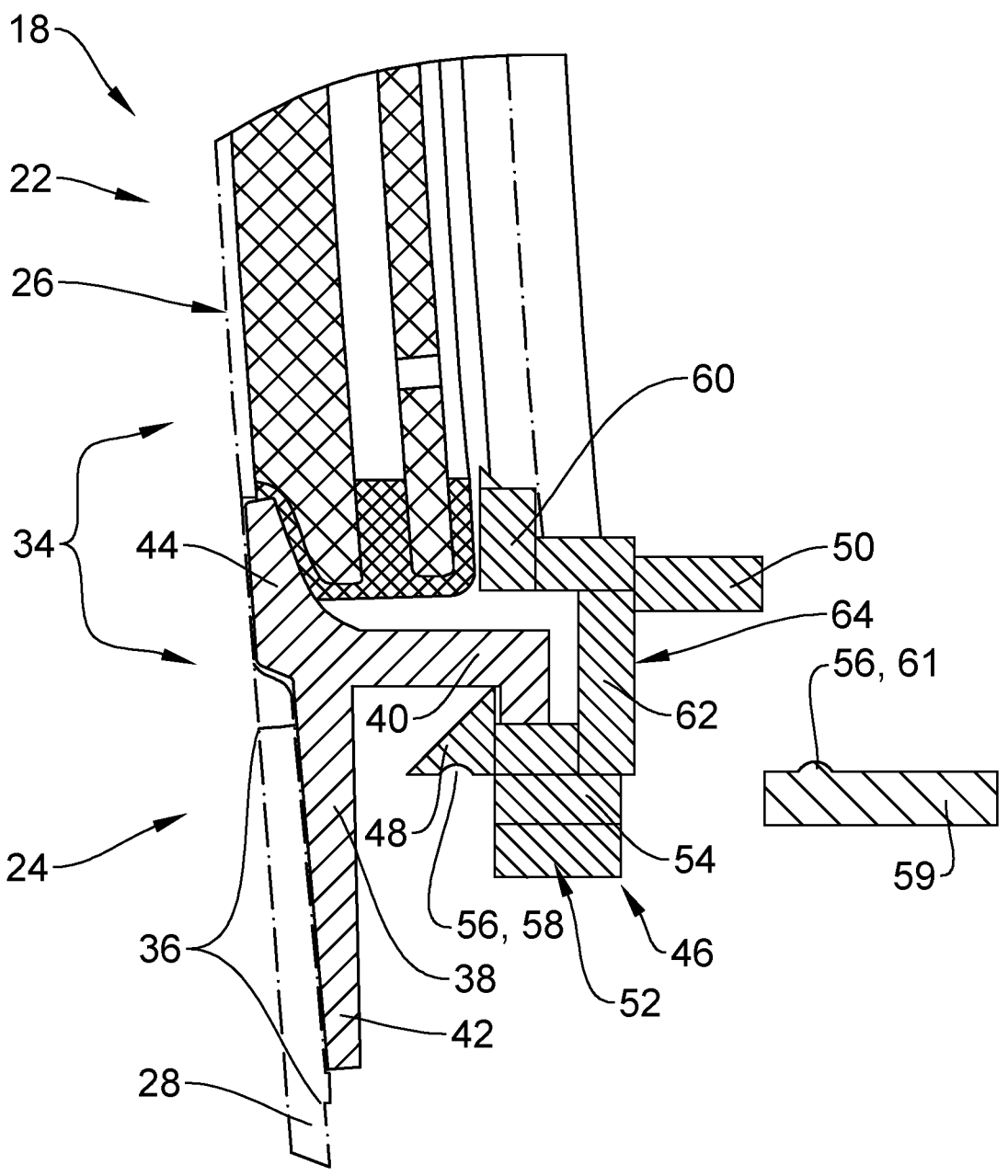
FIG. 3 depicts a vertical cross-section through the fuselage portion in an unlocked state.
Figure 4:
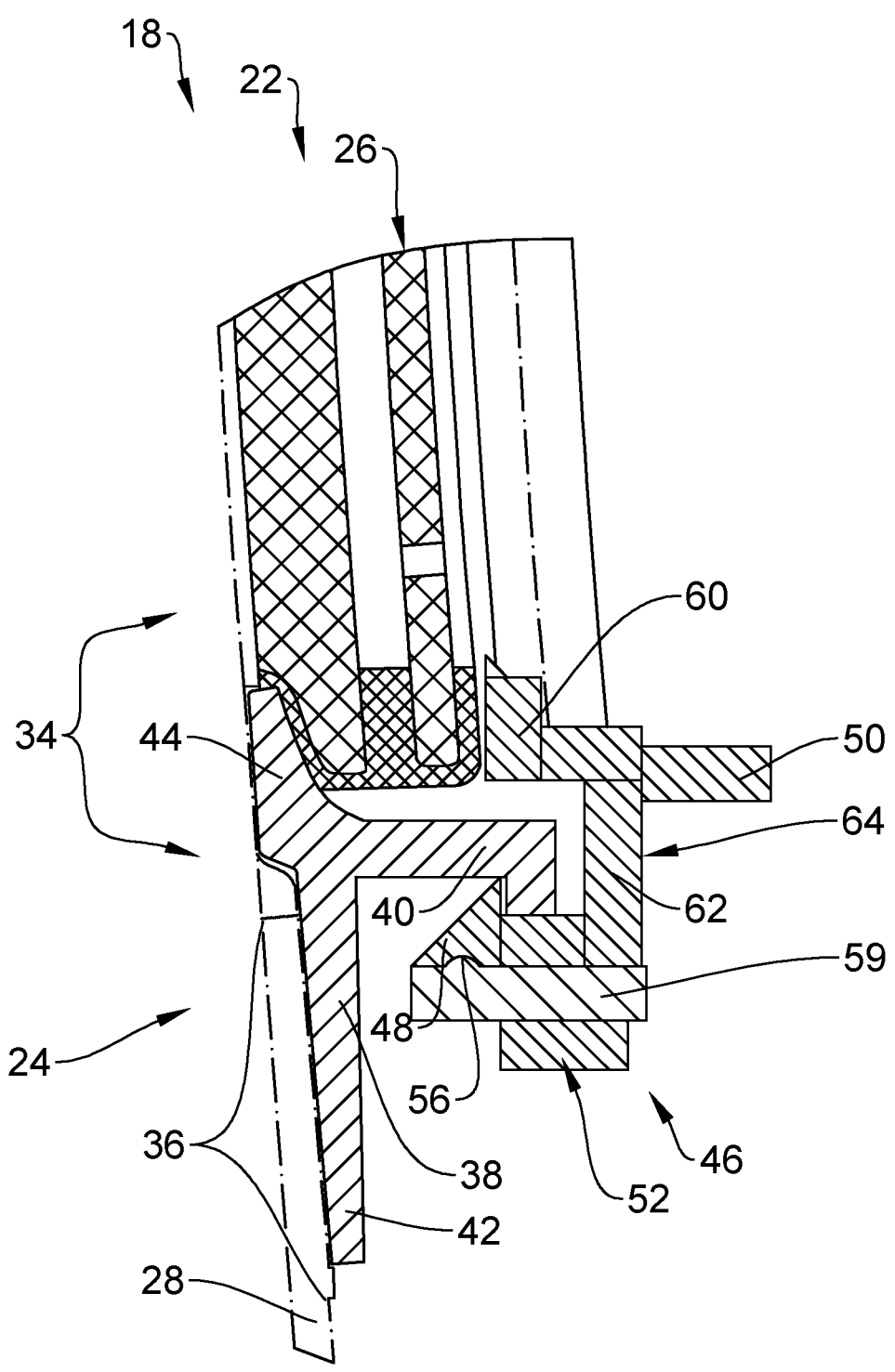
FIG. 4 depicts a vertical cross-section through the fuselage portion in a locked state.

Referring to FIG. 2 and FIG. 3, a fuselage portion 22 is described in more detail. The fuselage portion 22 includes a window mounting structure 24. The window mounting structure 24 is configured to mount a window pane assembly 26 to the fuselage portion 22. The window mounting structure 24 includes an outer skin 28. The outer skin 28 may be supported by a plurality of frames 30 and stringers 32.

The window mounting structure 24 includes a window opening 34. The window opening 34 can be cut or formed in the outer skin 28. The window opening 34 is surrounded by a rim portion 36 that is a little bit thicker than the outer skin 28 in general. The rim portion 36 extends along a circumference of the window opening 34. The rim portion 36 thus extends along a circumferential direction of the window opening 34.

The window mounting structure 24 further includes a mounting support interface 38 that is fixed to the outer skin 28, preferably the rim portion 36, so as to surround the window opening 34. The mounting support interface 38 is generally a profiled member. The mounting support interface 38 is preferably integrally formed as a single unitary member.

The mounting support interface 38 includes a mounting portion 40. The mounting portion 40 protrudes axially inward with respect to the window opening 34, i.e., in a direction into the passenger cabin 20. The mounting protrusion 40 is preferably shaped as a barbed hook. The mounting portion 40 is formed around the entire circumference of the mounting support interface 38. The mounting portion 40 is thus spaced apart from the circumference of the window opening with a predetermined distance.

The mounting support interface 40 includes a rim fastening portion 42. The rim fastening portion 42 protrudes radially outward with respect to the window opening 34, i.e., in a direction parallel to the outer skin 28. The rim fastening portion 42 is fastened to the rim portion 36 and covers the rim portion 36 for the most part. The mounting portion 40 and the rim fastening portion 42 are (nearly) orthogonal relative to each other, when viewed in a cross-section.

The mounting support interface 40 includes a window pane assembly support portion 44. The window pane assembly support portion 44 protrudes radially inward with respect to the window opening 34, i.e., in a direction parallel to the outer skin 28 but opposite the rim fastening portion 42.

The window mounting structure 24 further includes a mounting frame 46. The mounting frame 46 is generally configured to be attached to the mounting support interface 40 by pressing the mounting frame 46 towards the mounting support interface 40. The mounting frame 46 is generally ring shaped so as to match the contour defined by the window opening 34.

The mounting frame 46 includes an engaging portion 48. The engaging portion 48 extends axially outward with respect to the window opening 34, i.e., in a main direction perpendicular to the outer skin 28 towards the outer skin 28. The engaging portion 48 is configured to engage the mounting portion 40 in a form-fitting manner. The shape of the engaging portion 48 is chosen accordingly. The engaging portion 48 is preferably shaped as a hook.

The mounting frame 46 includes a cabin interface portion 50. The cabin interface portion 50 is configured to support or attach an interior cabin component, such as an inner panel (not shown).

The mounting frame 46 includes a locking portion 52. The locking portion 52 is arranged adjacent to the engaging portion 48. The locking portion 52 is arranged on a side facing away from the engaging portion 48. The locking portion 52 includes a locking opening 54. The locking opening 54 is aligned substantially in parallel to the engaging portion 48. The locking portion 52 may also include a securing mechanism 56. The securing mechanism 56 may include a securing notch 58 that is formed in the engaging portion 48 on a side facing away from the mounting support interface 38.

The window mounting structure 24 may also include a locking member 59. The locking member 59 is configured to be inserted into the locking opening 54. The locking member 59 may include a securing lug 61 that matches the securing notch 58.

The mounting frame 46 includes a window pane assembly retaining portion 60. The window pane assembly retaining portion 60 protrudes parallel to the engaging portion 48 but space apart therefrom.

The mounting frame 46 includes a body portion 62 that connects the engaging portion 48 with the window pane assembly retaining portion 60. The body portion 62 may include at least one inspection opening 64 for checking the correct alignment and mounting of the mounting frame 46.

Referring to FIGS. 2 and 3 a mounting of the window pane assembly 26 is described. Initially, a fuselage portion 22 is prepared with a window opening 34. The window opening 34 surrounded with the rim portion 36. The mounting support interface 38 is attached to the rim portion 36 using the rim fastening portion 42.

Next, the window pane assembly 26 is inserted into the window opening 34 such that the window pane assembly 26 engages the window pane assembly support portion 44.

Then the mounting frame 46 is aligned with and pressed towards the mounting support interface 38. The engaging portion 48 slightly deforms and engages the undercut formed by the mounting portion 40. This is repeated all around the window opening 34 until the entire engaging portion 48 engages with the mounting portion 40 in a form-fitting manner.

The locking member 59 is inserted into the locking opening 54 thereby bringing the locking portion 52 into the locked state. In this state, the engaging portion 48 is prevented from disengaging from the mounting portion 40.

The locking member 59 is secured by the securing lug 61 engaging the securing notch 58.

In order to dismount the window pane assembly 26, the steps are generally performed in reverse order. First, the locking member 59 is removed by overcoming the forces generated by the securing lug 61 engaging the securing notch.

A tool is inserted into the locking opening 54 and used as a lever to disengage the engaging portion 48 from the mounting portion 40 all around the window opening 34. Now the window pane assembly 26 is again free.

As the case may be, also the mounting support interface 38 can be removed, if necessary.

Figure 5:
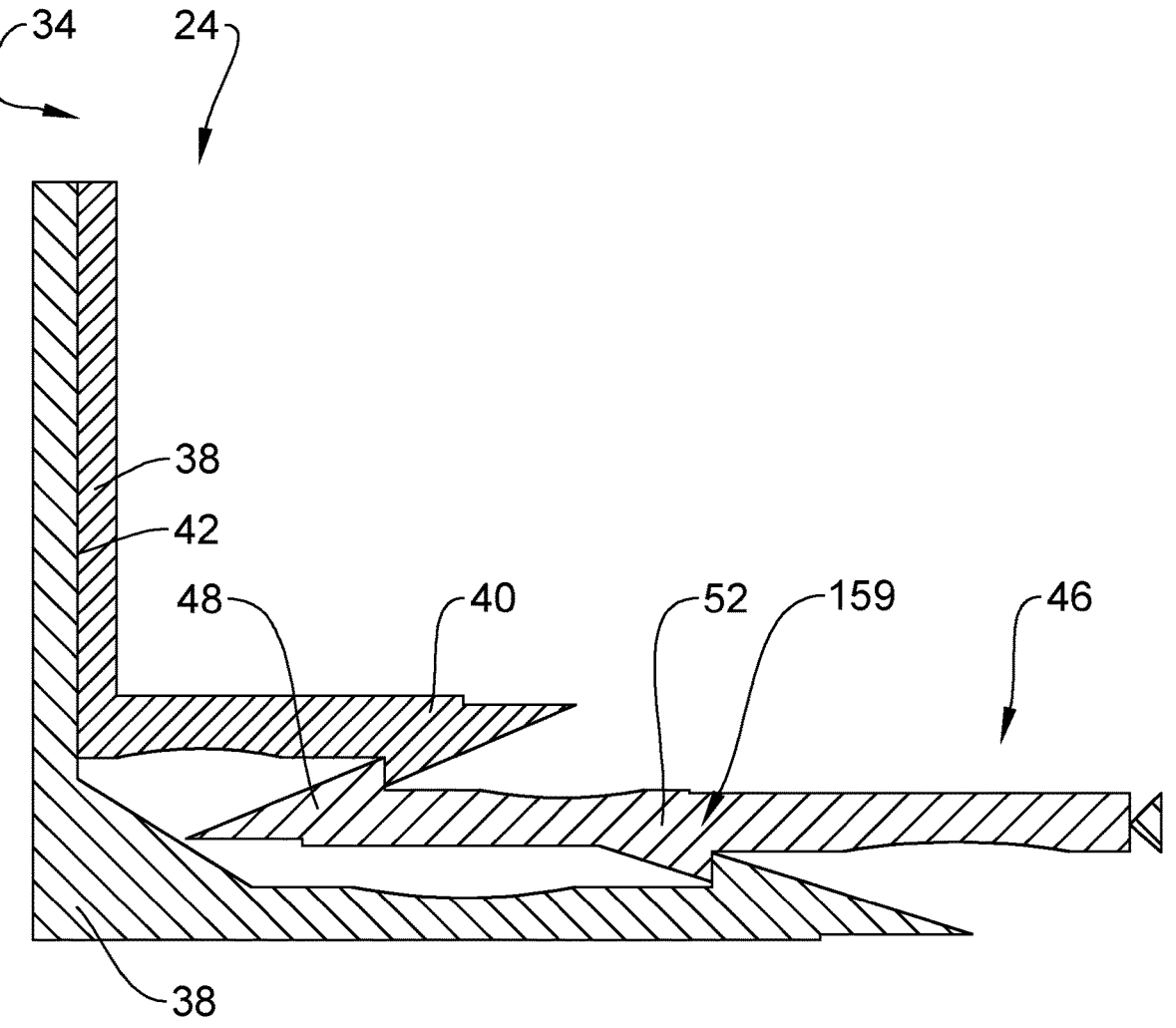
FIG. 5 depicts a variant of a window mounting structure.

Referring to FIG. 5 a variant of the window mounting structure 24 is described. In this variant, the locking portion 52 includes a locking protrusion 159 that protrudes in the opposite direction as the engaging portion 48. Both the engaging portion 48 and the locking protrusion 159 engage the mounting support interface 38. The mounting frame 46 can again be easily installed by pressing the mounting frame 46 into position. The mounting frame 46 can be removed by engaging a tool with both the engaging portion 48 and the locking protrusion 159.

Figure 6:
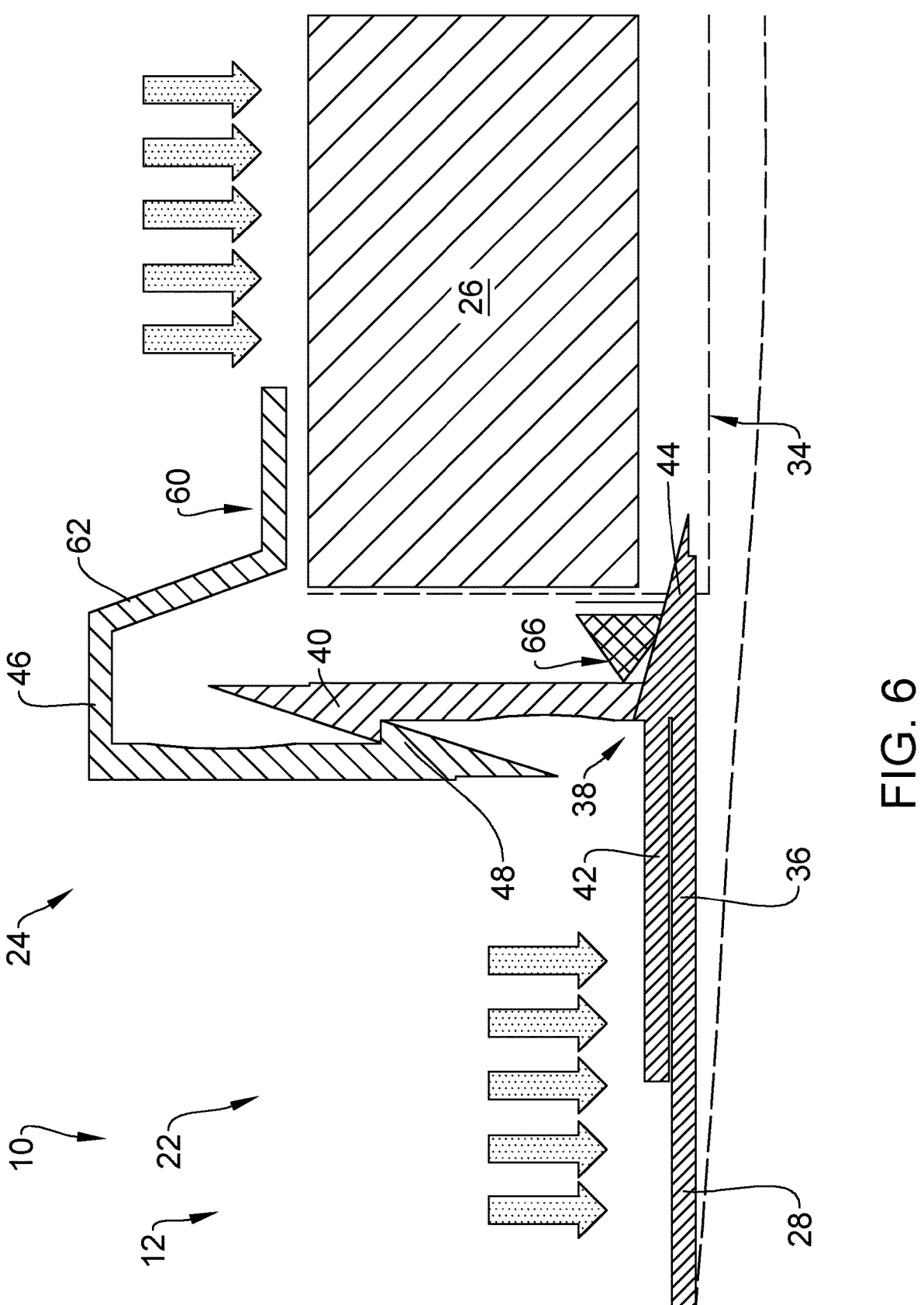
FIG. 6 depicts a load scenario with higher cabin pressure.

Referring to FIG. 6, a typical load scenario during flight is described in more detail. Typically, at cruise altitude the cabin pressure is about 700 mbar higher than the environmental pressure. As indicated, by the dot-filled arrows, the window pane assembly 26 is urged towards the outside (bottom of FIG. 6). It is also possible for the outer skin 28 to bulge and be deformed in the vicinity of the window opening 34. It should be noted that despite substantial forces act on the window pane assembly 26 and/or the outer skin 28, the form-fitting engagement between the mounting portion 40 and the engaging portion 48 is unaffected in this load scenario due to the portions 40, 48 being arranged inside the passenger cabin 20 and being sealed off from the environment by sealing member 66.

Figure 7:
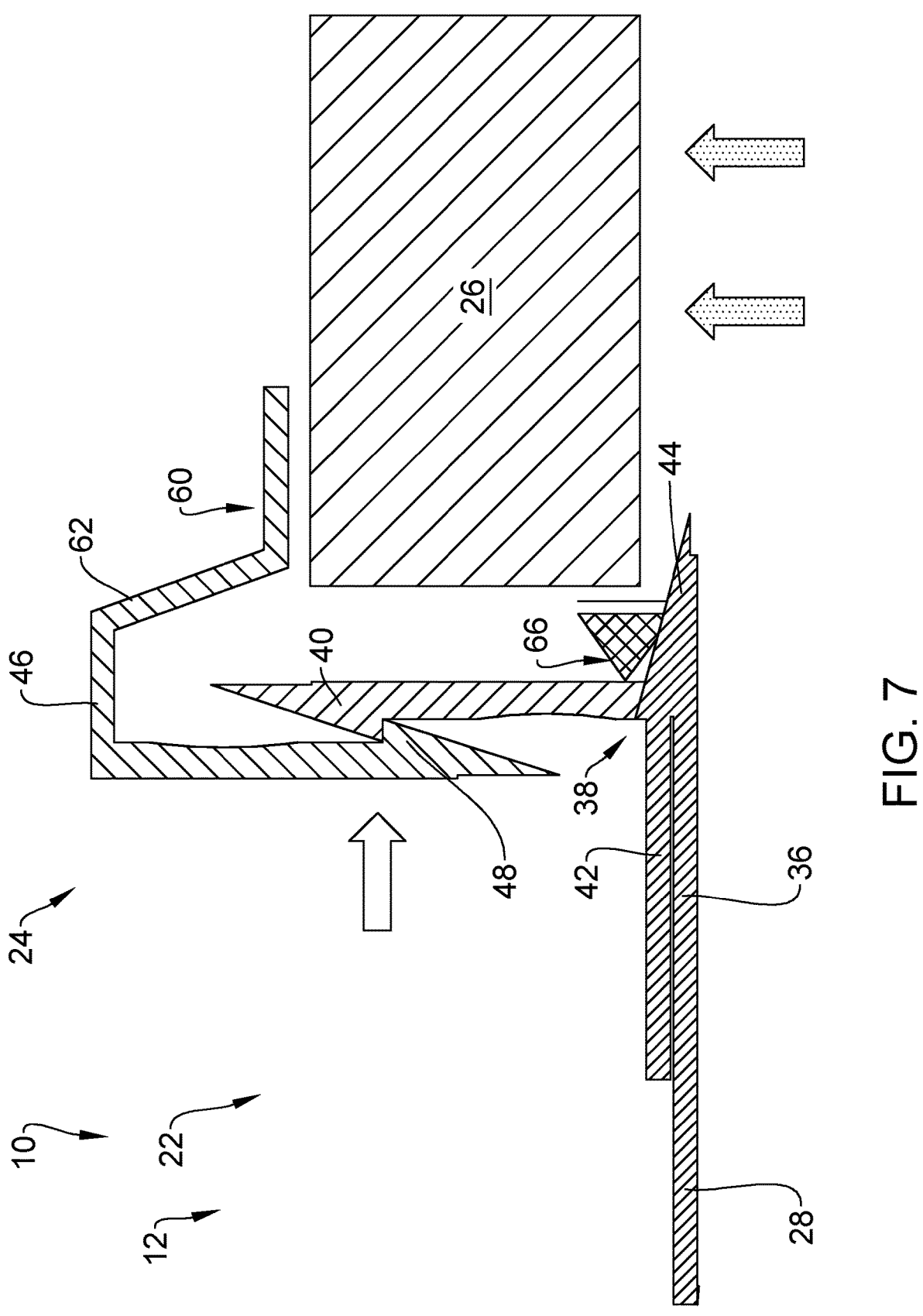
FIG. 7 depicts a load scenario with lower cabin pressure.

Referring to FIG. 7, a possible load scenario during landing is described. It may happen that during landing the pressure in the passenger cabin 20 might drop about 10 mbar lower than the environmental pressure. In this scenario, the window pane assembly 26 is urged towards the cabin interior (top of FIG. 7). The pressure difference is generally too small to affect the outer skin 28 in this scenario. However, the window pane assembly 26 urges the window pane assembly retaining portion 60 towards the cabin interior. As a result of the distance of the window pane assembly 26 from the engaging portion 48, a hinge effect urges the engaging portion 48 towards the mounting 40, thereby causing a closing moment that increases the form-fitting engagement of the two portions 40, 48 with each other. In addition, the sufficient shape elasticity of the mounting frame 46 is able to absorb the sudden movement of the window pane assembly 26.

In order to improve installing and maintaining aircraft windows 18, the invention proposes a window mounting structure 24 that has a mounting support interface 38 which is installed on the fuselage 12. The window pane assembly 26 is inserted in the window opening 34 and a mounting frame 46 is pressed onto the mounting support interface 38. The mounting frame 46 may be locked in place with a locking member 59.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage 14 wings
16 engine
18 window
20 passenger cabin
22 fuselage portion
24 window mounting structure
26 window pane assembly
28 outer skin
30 frame
32 stringer
34 window opening
36 rim portion
38 mounting support interface
40 mounting portion
42 rim fastening portion
44 window pane assembly support portion
46 mounting frame
48 engaging portion
50 cabin interface portion
52 locking portion
54 locking opening
56 securing mechanism
58 securing notch
59 locking member
60 window pane assembly retaining portion
61 securing lug
62 body portion
64 inspection opening
66 sealing member 66
159 locking protrusion

The invention claimed is:

1. A window mounting structure for mounting a window pane assembly for an aircraft, the window mounting structure comprising:

a fuselage portion that includes an outer skin portion, the outer skin portion having a window opening having a circumference and a rim portion that is disposed along the circumference;

a mounting support interface that is fastened to the rim portion and that has a mounting portion that extends parallel to the circumference with a predetermined distance, wherein the mounting portion has a hook shape;

a ring shaped mounting frame that matches the contour of the window opening and that includes an engaging portion that is configured to be engaged with the hook shape of the mounting portion in a form-fitting manner by pressing the ring shaped mounting frame towards the mounting support interface, wherein the ring shaped mounting frame includes a locking portion that is configured to allow disengaging of the engaging portion from the mounting portion when in an unlocked state and to prevent disengaging of the engaging portion from the mounting portion when in a locked state, wherein the ring shaped mounting frame comprises a locking member that engages the engaging portion so as to prevent disengagement of the engaging portion from the mounting portion, when the locking portion is in the locked state, and wherein the locking portion comprises a locking opening, and the locking member is inserted in the locking opening when in the locked state.

2. The window mounting structure according to claim 1, wherein the ring shaped mounting frame includes a window pane assembly retaining portion that is configured to at least one of block axial movement of the window pane assembly in an inward direction or press the window pane assembly in an outward direction.

3. The window mounting structure according to claim 1, wherein the ring shaped mounting frame includes a cabin interface portion that extends axially inward and is configured to at least one of support or attach to an interior cabin component.

4. The window mounting structure according to claim 1, wherein the locking portion is arranged on a side facing away from the engaging portion.

5. The window mounting structure according to claim 1, wherein the locking portion includes a securing mechanism that prevents the locking portion from accidentally switching from the locked state to the unlocked state.

6. The window mounting structure according to claim 1, wherein the locking portion comprises a locking protrusion that engages the mounting support interface in a form-fitting manner in the locked state.

7. The window mounting structure according to claim 1, wherein the ring shaped mounting frame includes at least one inspection opening that allows a visual inspection of a placement of the ring shaped mounting frame on the mounting support interface.

8. The window mounting structure according to claim 1, wherein the mounting support interface includes at least one of the following:

a rim fastening portion that extends radially outward from the window opening, and the rim fastening portion is at least one of fastened to or covers the rim portion; or a window pane assembly support portion that extends radially inward from the window opening so as to engage the window pane assembly in a form-fitting manner and to block an axial movement of the window pane assembly in an outward direction.

9. The window mounting structure according to claim 8, and wherein at least one of at least one of the rim fastening portion or the window pane assembly support portion are formed along the entire circumference;

the engaging portion is formed in a plurality of sections that are distributed along the circumference; or the engaging portion is formed along the entire circumference.

10. An aircraft fuselage comprising a window pane assembly that is arranged in the window opening and the window mounting structure according to claim 1, wherein the window mounting structure fastens the window pane assembly to the aircraft fuselage.

11. An aircraft comprising an aircraft fuselage according to claim 10.

12. A method for mounting a window pane assembly to an aircraft fuselage, the method comprising:

a) preparing a fuselage portion that includes an outer skin portion, the outer skin portion having a window opening having a circumference and a rim portion that is disposed along the circumference and fastening a mounting support interface to the rim portion, wherein the mounting support interface has a mounting portion that extends parallel to the circumference with a predetermined distance, wherein the mounting portion has a hook shape;

b) pressing a ring shaped mounting frame that matches the contour of the window opening and that includes an engaging portion towards the mounting support interface such that the engaging portion engages the hook shape of the mounting portion in a form-fitting manner and the ring shaped mounting frame retains the window pane assembly, wherein the ring shaped mounting frame includes a locking portion that is configured to allow disengaging of the engaging portion from the mounting portion when in an unlocked state and to prevent disengaging of the engaging portion from the mounting portion when in a locked state, wherein the ring shaped mounting frame comprises a locking member that engages the engaging portion so as to prevent disengagement of the engaging portion from the mounting portion, when the locking portion is in the locked state, and wherein the locking portion comprises a locking opening, and the locking member is inserted in the locking opening when in the locked state.

13. A method for dismounting a window pane assembly from an aircraft fuselage by performing step b) or the steps of the method according to claim 12 in reverse order.

\* \* \* \* \*